US007522537B2

(12) United States Patent
Joshi

(10) Patent No.: US 7,522,537 B2
(45) Date of Patent: Apr. 21, 2009

(54) SYSTEM AND METHOD FOR PROVIDING CONNECTIVITY BETWEEN AN INTELLIGENT ACCESS POINT AND NODES IN A WIRELESS NETWORK

(75) Inventor: Avinash Joshi, Orlando, FL (US)

(73) Assignee: MeshNetworks, Inc., Maitlands, FL (US)

(*) Notice: Subject to any disclaimer, the term of this patent is extended or adjusted under 35 U.S.C. 154(b) by 0 days.

(21) Appl. No.: 10/755,346

(22) Filed: Jan. 13, 2004

(65) Prior Publication Data

US 2004/0143842 A1 Jul. 22, 2004

Related U.S. Application Data

(60) Provisional application No. 60/439,448, filed on Jan. 13, 2003, provisional application No. 60/439,449, filed on Jan. 13, 2003, provisional application No. 60/439,455, filed on Jan. 13, 2003, provisional application No. 60/476,237, filed on Jun. 6, 2003.

(51) Int. Cl.
*H04L 12/28* (2006.01)
*H04Q 7/24* (2006.01)

(52) U.S. Cl. ...................... 370/254; 370/338
(58) Field of Classification Search ............ 370/254, 370/315, 338
See application file for complete search history.

(56) References Cited

U.S. PATENT DOCUMENTS

| 4,494,192 A | 1/1985 | Lew et al. |
| 4,617,656 A | 10/1986 | Kobayashi et al. |
| 4,736,371 A | 4/1988 | Tejima et al. |
| 4,742,357 A | 5/1988 | Rackley |
| 4,747,130 A | 5/1988 | Ho |
| 4,910,521 A | 3/1990 | Mellon |
| 5,034,961 A | 7/1991 | Adams |

(Continued)

FOREIGN PATENT DOCUMENTS

CA 2132180 3/1996

(Continued)

OTHER PUBLICATIONS

Perkins, Charles et al., "Ad Hoc On-Demand Distance Vector (AODV) Routing," Jun. 19, 2002.*

(Continued)

*Primary Examiner*—Kevin C Harper
(74) *Attorney, Agent, or Firm*—Randi L. Karpinia; Joseph J. Buczynski

(57) ABSTRACT

A system and method enables an ad-hoc communication network to maintain connectivity between intelligent access points and nodes. The method includes: broadcasting an access point advertisement from a sender node to wireless routers; deciding by the wireless routers whether to use the sender node as a next hop towards the intelligent access point based on routing criterion associated with the wireless routers and contents of the access point advertisement; transmitting a unicast route request from the wireless routers to the intelligent access point; transmitting a unicast route reply from the sender node to the wireless router in response to receiving the unicast route request; storing a route entry associated with the intelligent access point in the wireless router; and periodically broadcasting a hello message from the wireless router to the nodes identifying the route from the wireless router to the intelligent access point using the stored route entry.

49 Claims, 6 Drawing Sheets

Proactive IAP Locator Daemon

U.S. PATENT DOCUMENTS

| | | | |
|---|---|---|---|
| 5,068,916 A | 11/1991 | Harrison et al. | |
| 5,231,634 A | 7/1993 | Giles et al. | |
| 5,233,604 A | 8/1993 | Ahmadi et al. | |
| 5,241,542 A | 8/1993 | Natarajan et al. | |
| 5,317,566 A | 5/1994 | Joshi | |
| 5,392,450 A | 2/1995 | Nossen | |
| 5,412,654 A | 5/1995 | Perkins | |
| 5,424,747 A | 6/1995 | Chazelas | |
| 5,502,722 A | 3/1996 | Fulghum | |
| 5,517,491 A | 5/1996 | Nanni et al. | |
| 5,555,425 A | 9/1996 | Zeller et al. | |
| 5,555,540 A | 9/1996 | Radke | |
| 5,572,528 A | 11/1996 | Shuen | |
| 5,615,212 A | 3/1997 | Ruszczyk et al. | |
| 5,618,045 A | 4/1997 | Kagan et al. | |
| 5,621,732 A | 4/1997 | Osawa | |
| 5,623,495 A | 4/1997 | Eng et al. | |
| 5,627,976 A | 5/1997 | McFarland et al. | |
| 5,631,897 A | 5/1997 | Pacheco et al. | |
| 5,644,576 A | 7/1997 | Bauchot et al. | |
| 5,652,751 A | 7/1997 | Sharony | |
| 5,680,392 A | 10/1997 | Semaan | |
| 5,684,794 A | 11/1997 | Lopez et al. | |
| 5,687,194 A | 11/1997 | Paneth et al. | |
| 5,696,903 A | 12/1997 | Mahany | |
| 5,701,294 A | 12/1997 | Ward et al. | |
| 5,706,428 A | 1/1998 | Boer et al. | |
| 5,717,689 A | 2/1998 | Ayanoglu | |
| 5,745,483 A | 4/1998 | Nakagawa et al. | |
| 5,774,876 A | 6/1998 | Wooley et al. | |
| 5,781,540 A | 7/1998 | Malcolm et al. | |
| 5,787,080 A | 7/1998 | Hulyalkar et al. | |
| 5,794,154 A | 8/1998 | Bar-On et al. | |
| 5,796,732 A | 8/1998 | Mazzola et al. | |
| 5,796,741 A | 8/1998 | Saito et al. | |
| 5,805,593 A | 9/1998 | Busche | |
| 5,805,842 A | 9/1998 | Nagaraj et al. | |
| 5,805,977 A | 9/1998 | Hill et al. | |
| 5,809,518 A | 9/1998 | Lee | |
| 5,822,309 A | 10/1998 | Ayanoglu et al. | |
| 5,844,905 A | 12/1998 | McKay et al. | |
| 5,845,097 A | 12/1998 | Kang et al. | |
| 5,857,084 A | 1/1999 | Klein | |
| 5,870,350 A | 2/1999 | Bertin et al. | |
| 5,877,724 A | 3/1999 | Davis | |
| 5,881,095 A | 3/1999 | Cadd | |
| 5,881,372 A | 3/1999 | Kruys | |
| 5,886,992 A | 3/1999 | Raatikainen et al. | |
| 5,896,561 A | 4/1999 | Schrader et al. | |
| 5,903,559 A | 5/1999 | Acharya et al. | |
| 5,909,651 A | 6/1999 | Chander et al. | |
| 5,936,953 A | 8/1999 | Simmons | |
| 5,943,322 A | 8/1999 | Mayer et al. | |
| 5,987,011 A | 11/1999 | Toh | |
| 5,987,033 A | 11/1999 | Boer et al. | |
| 5,991,279 A | 11/1999 | Haugli et al. | |
| 6,028,853 A | 2/2000 | Haartsen | |
| 6,029,217 A | 2/2000 | Arimilli et al. | |
| 6,034,542 A | 3/2000 | Ridgeway | |
| 6,044,062 A | 3/2000 | Brownrigg et al. | |
| 6,047,330 A | 4/2000 | Stracke, Jr. | |
| 6,052,594 A | 4/2000 | Chuang et al. | |
| 6,052,752 A | 4/2000 | Kwon | |
| 6,064,626 A | 5/2000 | Stevens | |
| 6,067,291 A | 5/2000 | Kamerman et al. | |
| 6,067,297 A | 5/2000 | Beach | |
| 6,078,566 A | 6/2000 | Kikinis | |
| 6,104,712 A | 8/2000 | Robert et al. | |
| 6,108,738 A | 8/2000 | Chambers et al. | |
| 6,115,580 A | 9/2000 | Chuprun et al. | |
| 6,122,690 A | 9/2000 | Nannetti et al. | |
| 6,130,881 A | 10/2000 | Stiller et al. | |
| 6,132,306 A | 10/2000 | Trompower | |
| 6,147,975 A | 11/2000 | Bowman-Amuah | |
| 6,163,699 A | 12/2000 | Naor et al. | |
| 6,178,337 B1 | 1/2001 | Spartz et al. | |
| 6,192,053 B1 | 2/2001 | Angelico et al. | |
| 6,192,230 B1 | 2/2001 | Van Bokhorst et al. | |
| 6,208,870 B1 | 3/2001 | Lorello et al. | |
| 6,222,463 B1 | 4/2001 | Rai | |
| 6,222,504 B1 | 4/2001 | Oby | |
| 6,223,240 B1 | 4/2001 | Odenwald et al. | |
| 6,240,294 B1 | 5/2001 | Hamilton et al. | |
| 6,246,875 B1 | 6/2001 | Seaholtz et al. | |
| 6,249,516 B1 | 6/2001 | Brownrigg et al. | |
| 6,275,707 B1 | 8/2001 | Reed et al. | |
| 6,285,892 B1 | 9/2001 | Hulyalkar | |
| 6,304,556 B1 | 10/2001 | Haas | |
| 6,327,300 B1 | 12/2001 | Souissi et al. | |
| 6,349,091 B1 | 2/2002 | Li | |
| 6,349,210 B1 | 2/2002 | Li | |
| 6,359,872 B1 | 3/2002 | Mahany et al. | |
| 6,366,568 B1 | 4/2002 | Bolgiano et al. | |
| 6,405,049 B2 | 6/2002 | Herrod et al. | |
| 7,006,472 B1 | 2/2006 | Immonen et al. | |
| 2001/0006552 A1 | 7/2001 | Salokannel | |
| 2001/0016500 A1 | 8/2001 | Son et al. | |
| 2001/0040895 A1* | 11/2001 | Templin | 370/466 |
| 2001/0053699 A1 | 12/2001 | McCrady et al. | |
| 2002/0013856 A1 | 1/2002 | Garcia-Luna-Aceves | |
| 2002/0133534 A1 | 9/2002 | Forslow | |
| 2002/0191573 A1 | 12/2002 | Whitehill et al. | |
| 2003/0018774 A1* | 1/2003 | Flinck et al. | 709/223 |
| 2003/0060211 A1 | 3/2003 | Chern et al. | |
| 2003/0110291 A1* | 6/2003 | Chen | 709/244 |
| 2003/0179742 A1* | 9/2003 | Ogier et al. | 370/351 |
| 2004/0025018 A1 | 2/2004 | Haas et al. | |
| 2004/0141511 A1 | 7/2004 | Rune et al. | |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong, et al., "Soft Handoffs in CDMA Mobile Systems," Dec. 1997, IEEE Personal Communications.

Wong et al., "A Pattern Recognition System for Handoff Algorithms," Jul. 2000, IEEE Journal on Selected Areas in Communications, vol. 18, No. 7.

Andras G. Valko, "Cellular IP: A New Approach to Internet Host Mobility," Jan. 1999, ACM Computer Communication Review.

Richard North, Dale Bryan and Dennis Baker, "Wireless Networked Radios: Comparison of Military, Commercial and R&D Protocols," Feb. 28-Mar. 3, 1999, 2nd Annual UCSD Conference on Wireless Communications, San Diego, CA.

Benjamin B. Peterson, Chris Kmiecik, Richard Hartnett, Patrick M. Thompson, Jose Mendoza and Hung Nguyen, "Spread Spectrum Indoor Geolocation," Aug. 1998, Navigation: Journal of the Institute of Navigation, vol. 45, No. 2, Summer 1998.

Josh Broch, David A. Maltz, David B. Johnson, Yin-Chun Hu and Jorjeta Jetcheva, "A Performance Comparison of Multi-Hop Wireless Ad Hoc Network Routing Protocols," Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol", no date.

Chip Elliott and Bob Heile, "Self-Organizing, Self-Healing Wireless Networks," 2000 IEEE, no month.

J.J. Garcia-Luna-Aceves and Asimakis Tzamaloukas, "Reversing the Collision-Avoidance Handshake in Wireless Networks", no date.

J.J. Garcia-Luna-Aceves and Marcelo Spohn, "Transmission-Efficient Routing in Wireless Networks Using Link-State Information", no date.

J.J. Garcia-Luna-Aceves and Ewerton L. Madruga, "The Core-Assisted Mesh Protocol," Aug. 1999, IEEE Journal on Selected Areas in Communications, vol. 17, No. 8.

Ad Kamerman and Guido Aben, "Net Throughput with IEEE 802.11 Wireless LANs", no date.

J. R. McChesney and R.J. Saulitis, "Optimization of an Adaptive Link Control Protocol for Multimedia Packet Radio Networks", 1999. no month.

Ram Ramanathan and Regina Rosales-Hain, "Topology Control of Multihop Wireless Networks Using Transmit Power Adjustment", 2000. no month.

Ram Ramanathan and Martha E. Steenstrup, "Hierarchically-Organized, Multihop Mobile Wireless Networks for Quality-of-Service Support", no date.

Martha E. Steenstrup, "Dynamic Multipoint Virtual Circuits for Multimedia Traffic in Multihop Mobile Wireless Networks", no date.

Zhenya Tang and J.J. Garcia-Luna-Aceves, "Collision-Avoidance Transmission Scheduling for Ad-Hoc Networks", no date.

George Vardakas and Wendell Kishaba, "QoS Networking With Adaptive Link Control and Tactical Multi-Channel Software Radios", no date.

Valko A. G. - Cellular IP: A New Approach To Internet Host Mobility - Computer Communications Review, vol. 29, No. 1, Jan. 1999 - pp. 50-65 - XP-000823873.

jJiang M-H et al - ASN Efficient Multiple-Path Routing Protocol For Ad Hoc Networks - Computer Communications, amsterdam, NL., vol. 25, No. 5, Mar. 2002, pp. 478-484 - XP004332672.

* cited by examiner

G* = Gratuitous RREP

Proactive IAP Locator Daemon

Handoff -Typical Scenario

SYSTEM AND METHOD FOR PROVIDING CONNECTIVITY BETWEEN AN INTELLIGENT ACCESS POINT AND NODES IN A WIRELESS NETWORK

The present invention claims benefit under 35 U.S.C. § 119(e) from U.S. Provisional Patent Application Ser. Nos. 60/439,448, 60/439,449 and 60/439,455 of Avinash Joshi, each filed on Jan. 13, 2003, and from U.S. Provisional Patent Application Ser. No. 60/476,237 of Avinash Joshi, filed on Jun. 6, 2003, the entire contents of each being incorporated herein by reference.

BACKGROUND OF THE INVENTION

1. Field of the Invention

The present invention relates to a system and method for enabling an ad-hoc communication network to maintain connectivity within mobile nodes and fixed nodes in the network in an effective and efficient manner with minimal overhead. More particularly, the present invention relates to a system and method for enabling an ad-hoc communication network to maintain connectivity between intelligent access points of the network and other nodes (e.g., wireless routers and subscriber devices which can be fixed or mobile) in the network while using an on-demand routing protocol. The present invention also relates to a system and method for achieving smooth handoffs of mobile nodes between fixed nodes in an ad-hoc communication network using an improved distance vector routing algorithm and unicast messages. Furthermore, the present invention relates to a system and method for modifying the Ad Hoc On-Demand Distance Vector Routing (AODV) protocol to facilitate smooth handoff of subscriber devices in an ad-hoc communication network while also eliminating unidirectional links between nodes in the network.

2. Description of the Related Art

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at the base node to communicate simultaneously with several mobile nodes in its coverage area.

In recent years, a type of mobile communications network known as an "ad-hoc" network has been developed. In this type of network, each mobile node is capable of operating as a base station or router for the other mobile nodes, thus eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", granted on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", granted on Oct. 19, 2004, and in U.S. Pat. No. 6,873,839 entitled "Prioritized-Routing for an Ad-Hoc, Peer-to-Peer, Mobile Radio Access System", granted on Mar. 29, 2005, the entire content of each being incorporated herein by reference.

As can be appreciated by one skilled in the art, since certain nodes of the ad-hoc network are mobile, it is necessary for the network to maintain connectivity with those nodes. Accordingly, needs exist for improved techniques to enable an ad-hoc network to maintain connectivity with the mobile nodes in the network in an effective and efficient manner with minimal overhead. Similarly, most of the traffic flows through the Access Point (AP) in such a network and hence, there exist a need for all nodes to maintain routes with the Access Point (AP) all the time in an effective and efficient manner with minimal overhead.

SUMMARY OF THE INVENTION

An object of the present invention is to provide a system and method for enabling an ad-hoc communication network to maintain connectivity within the mobile nodes and fixed nodes in the network in an effective and efficient manner with minimal overhead.

Another object of the present invention relates to a system and method for achieving smooth handoffs of mobile nodes between fixed nodes in an ad-hoc communication network.

These and other objects are substantially achieved by providing a system and method for enabling an ad-hoc communication network to maintain connectivity between intelligent access points of the network and other nodes (mobile nodes and fixed nodes) in the network while using an on-demand routing protocol.

These and other objects are further substantially achieved by providing a system and method, for use in an ad-hoc communication network, which enables the network to perform smooth handoffs of mobile nodes between fixed nodes in an ad-hoc communication network using an improved distance vector routing algorithm and unicast messages, thus avoiding an increase in routing advertisement frequency while keeping overhead at a minimum.

This and other objects are still further substantially achieved by providing a system and method for modifying the Ad Hoc On-Demand Distance Vector Routing (AODV) protocol to facilitate smooth handoff of subscriber devices in an ad-hoc communication network while also eliminating unidirectional links between nodes in the network.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
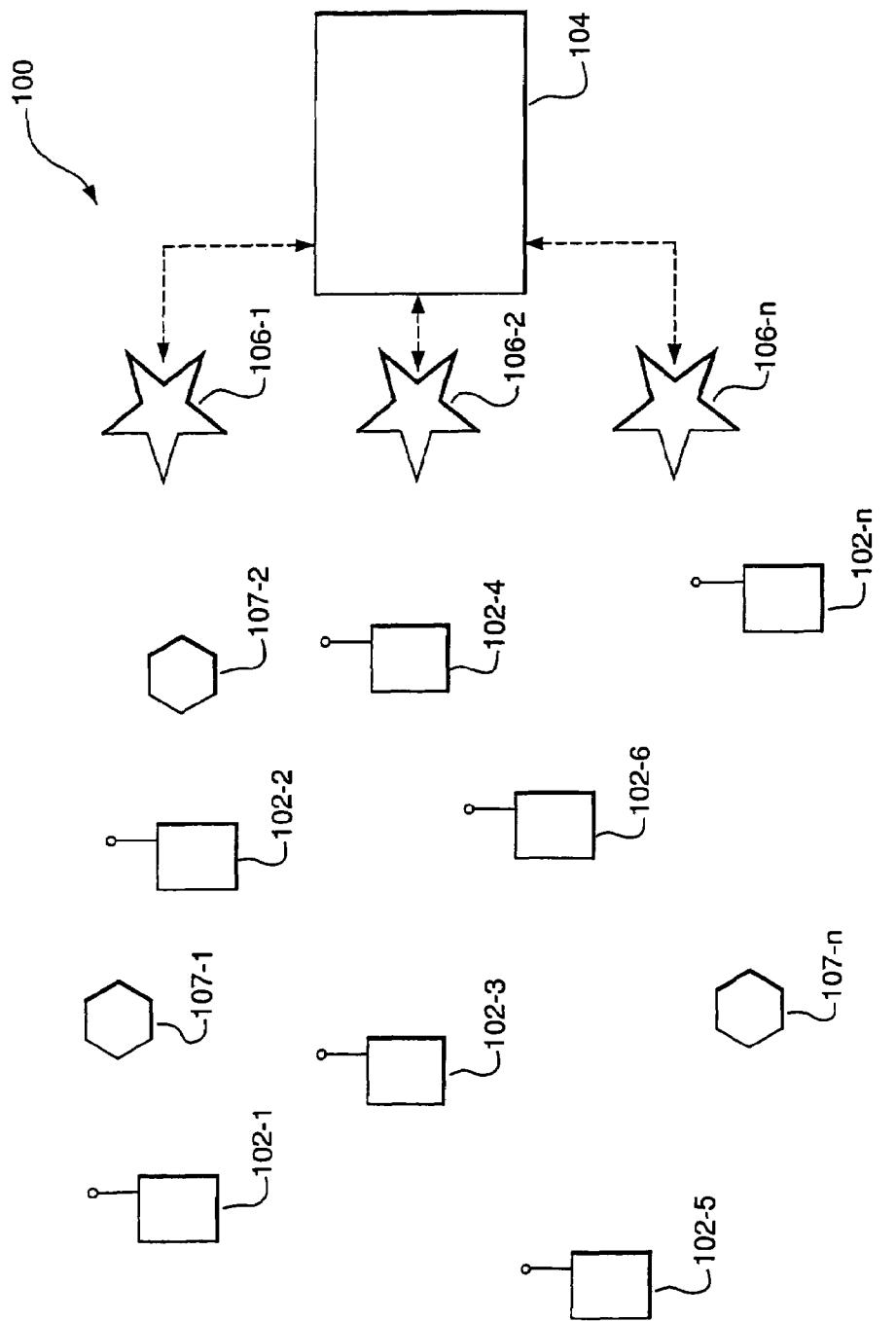
FIG. 1 is a block diagram of an example ad-hoc packet switched wireless communications network including a plurality of nodes in accordance with an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102, mobile nodes 102 or subscriber devices (SD)), and can, but is not required to, include a fixed network 104 having a plurality of intelligent access points 106-1, 106-2, ... 106-n (referred to generally as nodes 106, access points 106 or IAPs), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107, fixed routers 107 or wireless routers (WR)) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. No. 5,943,322 to Mayor, and in U.S. Pat. Nos. 7,072,650, 6,807,165, and 6,873,839, referenced above.

Figure 2:
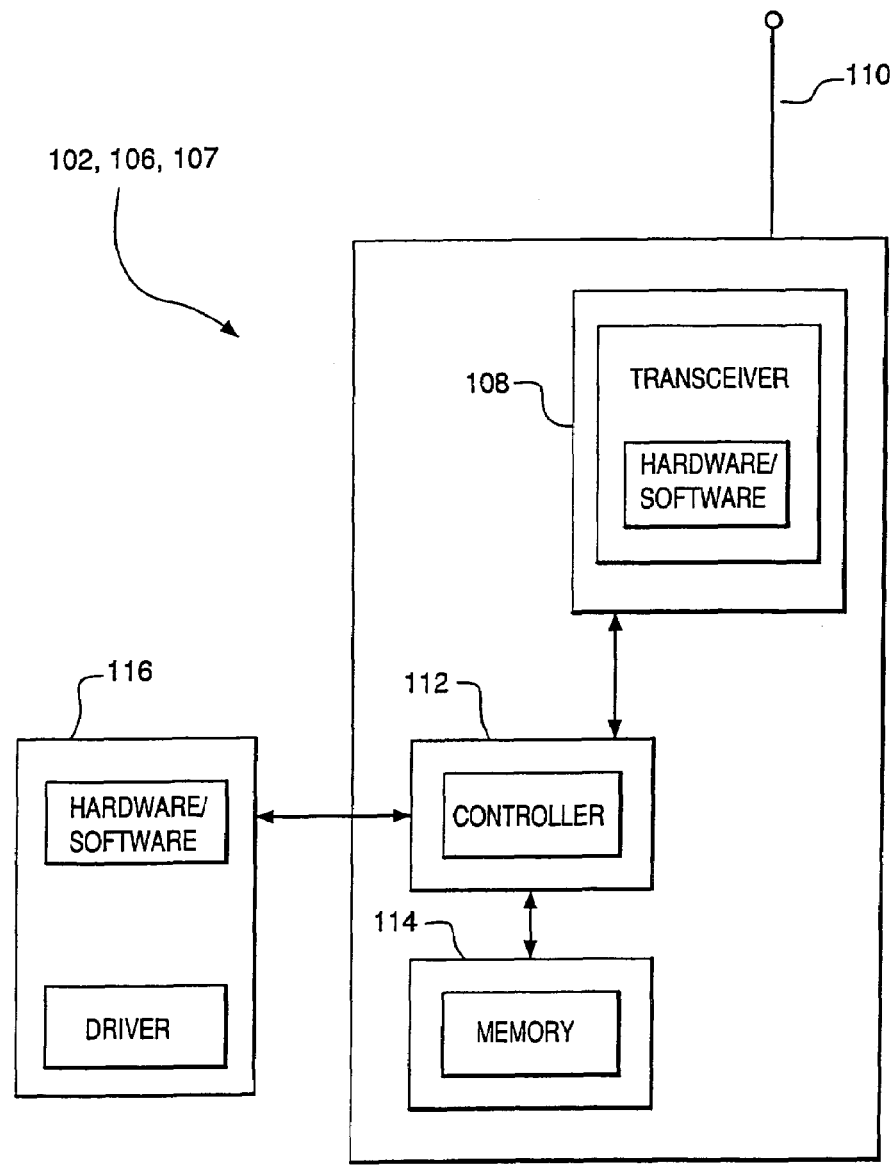
FIG. 2 is a block diagram illustrating an example of a mobile node employed in the network shown in FIG. 1.

As shown in FIG. 2, each node 102, 106 and 107 includes a transceiver 108 which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM), that is capable of storing, among other things, routing information pertaining to itself and other nodes in the network 100. The nodes 102, 106 and 107 take part in routing protocol which can be on demand or proactive and hence can send routing messages which can be Route Request, Route Reply, Route Error or Routing Advertisement whenever there is a change in the network topology or on a periodic basis.

As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

As can be appreciated from the above, in the network 100, an IAP 106 is the point of attachment of the wireless part and the wired Internet. If a Subscriber Device (SD) 102 is not in direct communication range with an IAP 106, the DS 102 depends upon other devices to reach the IAP 106. These devices can be other SDs 102 or Wireless Routers (WR) 107 which are deployed specifically to provide coverage to these SDs.

In an ad-hoc network such as network 100, all nodes need to maintain continuous connectivity with the Access Point (or IAP) as most of the traffic is to and from an IAP. This is true for both the field deployment and deployment in an office environment. Continuous connectivity is also needed to tunnel the dynamic host configuration protocol (DHCP) and address resolution protocol (ARP) IP broadcast to the IAP. If an on-demand protocol, such as the Ad Hoc On-Demand Distance Vector Routing protocol (AODV), is used in an ad-hoc network, no routes are maintained proactively. Accordingly, the embodiments of the present invention described herein provide routes to IAPs that can be maintained at all times with minimum overhead. This technique can also be used as an IAP association protocol. The technique has been named Proactive IAP Locator (PIL) protocol.

As can be appreciated by one skilled in the art, an on-demand routing protocol (for example AODV) creates routes only when desired by the source node. AODV is described in a publication by Charles E. Perkins, Elizabeth M. Belding-Royer, and Samir Das entitled "*Ad Hoc On Demand Distance Vector (AODV) Routing*", RFC 3561, July 2003, the entire contents of which are incorporated herein by reference.

Hence, when a node requires a route to a destination, the node initiates a route discovery process within the network 100. The commonly employed approach, referred to as an Expanding Ring Search, can increase the average latency of route discovery, as multiple discovery attempts and time-outs may be needed before a route to the target node is found, the high latency will require the source node to buffer the packets which may be difficult for memory constrained nodes in such a kind of network resulting in packet loss. Furthermore, this elongated route discovery process also increases the overhead as each discovery can lead to a network wide flood. Since most traffic in this kind of network flows between IAP and other nodes, such as WRs and SDs, these floods can be avoided if the nodes proactively maintain routes to the IAP. This will also avoid the latency and buffering of packets involved in finding route to an IAP. AODV also assumes bi-directional links among nodes, which can lead to incorrect routes. The technique according to the embodiments of the invention described herein avoids unidirectional links while finding routes from nodes to the IAP, and vice-versa.

An example of the process will now be described with reference to FIG. 3. In this example, it is assumed that all the nodes follow AODV routing protocol with the modifications in accordance with the embodiments of the present invention described herein. All the nodes will periodically broadcast a packet that is referred to as IAP Advertisements (IA). In place of an IA packet, the nodes can also use a regular "Hello Message" which is generally sent by all nodes in such network to maintain connectivity as described, for example, in a U.S. Patent Application Publication Number US20040258040A1, entitled "System and Method to Maximize Channel Utilization in a Multi-Channel Wireless Communication Network", published on Dec. 23, 2004, the entire contents of which being incorporated herein by reference.

The contents of the IA packet can be any combination of the following fields:

- Type of node: This will let other nodes know about the type of the device which can help them decide whether or not this node should be used to route packets. This field can also help in deciding the routing metrics as described in U.S. Provisional Patent No. 7,280,483, entitled "System And Method To Improve The Network Performance Of A Wireless Communications Network By Finding An Optimal Route Between A Source And A Destination," granted on Oct. 9, 2007.
- Number of hops from the associated IAP.
- Address of the node (IP or MAC address or both): This decision is based on whether the network uses layer 2 routing or layer 3 routing or a combination of both.
- Address of the associated IAP (IP or MAC address or both): This decision is based on whether the network uses layer 2 routing or layer 3 routing or a combination of both.
- Routing Metrics to the associated IAP: This field helps in deciding one route versus another as described, for example, in U.S. Pat. No. 7,280,483 referenced above, and in a U.S. Patent Application Publication US20020191573A1 of Eric A. Whitehill et al. entitled "EMBEDDED ROUTING ALGORITHMS UNDER THE INTERNET PROTOCOL ROUTING LAYER OF A SOFTWARE ARCHITECTURE PROTOCOL STACK", published on Dec. 19, 2002, the entire contents of which are incorporated herein by reference.
- Other Metrics (for example some metrics representing the load on the IAP like number of active users associated with the IAP or total bandwidth used by the users): this field can be used to do load balancing across multiple IAPs and achieve quality of service (QoS) goals across multiple IAPs.
- QoS metrics: Used for QoS Routing.
- Address of the node that is being used as next hop towards the IAP: This field can be used to perform a "Split Horizon" technique as done by classical distance vector protocols in the Internet as described below.
- Broadcast ID: a broadcast ID similar to that used in the AODV route request (RREQ) process, which is helpful in detecting duplicate packets and dropping those duplicates. This broadcast ID may not be required if some sequence number is already a part of MAC header to discard duplicate packets.
- Power Level: This message can either be sent at some fixed power that is known throughout the network, or power used should be indicated in this field of the packet. This will help the node receiving the packet to know the path loss between the transmitter and itself.
- TTL: The packet can also have a (time-to-live) TTL value set to NETWORK_DIAMETER, which depends upon the size of the network 100 and the maximum number of hops possible between an IAP and a node associated with that IAP. The TTL value can then be decremented by each protocol interface layer (PIL) daemon as the packet propagates throughout the network 100, which can control the maximum number of hops possible between an IAP and any other node in the network.
- A node can also send similar information about some other IAP/IAPs with which it is not associated. The information can include all the metrics mentioned above.

Figure 3:
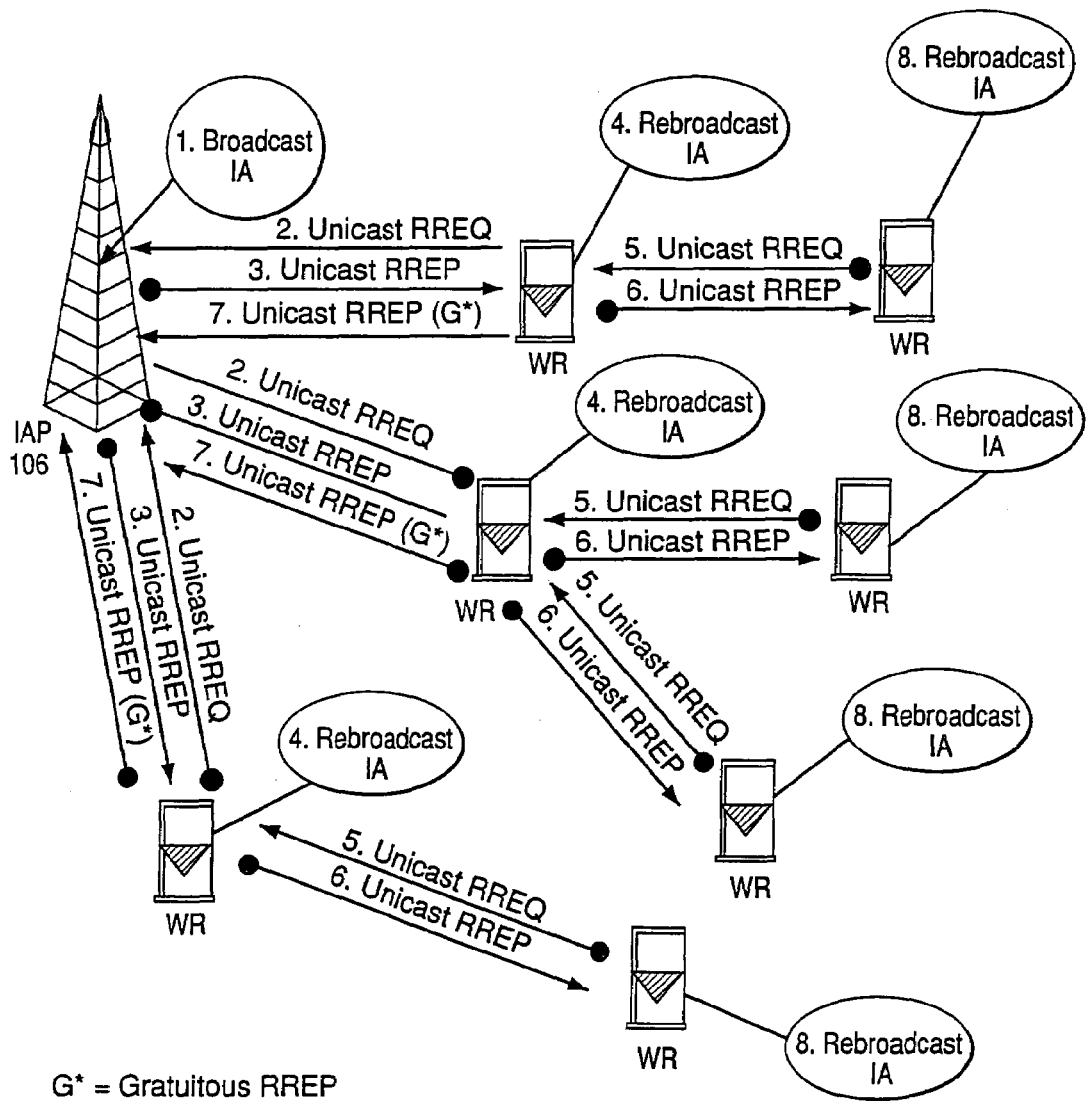
FIG. 3 is a conceptual block diagram of an example of the relationship between wireless routers and access points of the network shown in FIG. 1.

Referring to FIG. 3, the process is started when an IAP broadcasts one of these packets (step 1), and the nodes in the network 100 which are one hop away from the IAP receives it. On receiving such a message, the node stores the relevant information from the message in a table and compares that information against other entries if it has received the same message from other neighboring nodes. It can also simply discard the message if the next hop field in such a packet has its own address. This is done to avoid loops and is similar to the well-known "Split Horizon" method used in conjunction with Distance Vector Routing Protocol. As can be appreciated by one skilled in the art, Split Horizon is a well known method in wired networks to solve the "count-to-infinity" problem in distance vector protocol. Although the algorithm is not perfect and the problem of "count-to-infinity" can still exist if the number of nodes involved are more than 3, it is still useful. The algorithm selectively excludes a destination from an advertisement to a neighbor, if the next hop to that destination is that neighbor. Since the IA packet is a broadcast packet and sent in place of a unicast packet to an individual neighbor, the split horizon method cannot be used in its original form. Instead, the next hop used to reach the destination (an IAP in the present example) can be advertised in the packet. Hence, when a neighbor receiving the packet sees its address in the next hop field, it ignores the advertisement to avoid the "count-to-infinity" problem. Thus, the split horizon method is used on the receiver side in wireless network as opposed to being used on the transmitter side as in a wired network.

These nodes will now make a routing decision based on number of factors, including but limiting to, the number of hops, routing metrics, load balancing metrics, QoS metrics, and so on. If a node decides to use the sender of this message as a next hop towards the IAP (the IAP itself in the current example), then it sends a unicast Route Request (RREQ) for the IAP address to the node (the IAP in this case) which forwarded the IA packet (step 2). Unicasting the RREQ will confirm that the link is not a unidirectional link, but rather, a bidirectional link. If such a Route Request fails, the node can blacklist the sender for some time and wait for IA messages from other nodes so that the node can hop through those other nodes to reach IAP. The nodes that are successful in the route discovery process receive a Reply (RREP) back from the IAP (step 3), and the IAP also creates a reverse route back to the node following the normal AODV routing protocol. This reverse route can be used to send an IAP association/update message.

After obtaining the route, the nodes rebroadcast the IA message (step 4) after updating the relevant fields like increasing the hop count, decrementing the TTL, updating the different metrics etc. Nodes receiving this IA will repeat the procedure by unicasting a RREQ (step 5) to the forwarding node and receive a unicast Reply (RREP) from the forwarding node (step 6). It is noted that the G bit in this unicast RREQ will be set so that a Gratuitous RREP is also sent (step 7) to the destination node (in this case, the IAP), so that the IAP also learns of a route to the nodes. In this manner, knowledge of the IAP (which is the default route in network 100) is proactively flooded over the network 100. As indicated in step 8, the nodes receiving the rebroadcast IA then themselves re-broadcast the IA (step 8).

In accordance with the AODV protocol, after a node receives a RREQ and responds with a routing reply RREP, the node discards the RREQ. If intermediate nodes, such as other SDs or WRs, reply to every transmission of a given RREQ, the destination (e.g., IAP) does not receive any copies of the RREQ. In this situation, the destination does not learn of a route to the originating node. In an ad-hoc network, if WRs always reply to the RREQs, the IAP will never learn about any route to the SD. Currently, the AODV draft has a provision to let the destination know about this route. Specifically, the AODV draft states that in order that the destination learn of routes to the originating node, the originating node SHOULD set the "gratuitous RREP" ('G') flag in the RREQ. If, in response to a RREQ with a 'G' flag set, an intermediate node returns a RREP, it must also unicast a gratuitous RREP to the destination node. Charles E. Perkins, Elizabeth M. Belding-Royer, and Samir Das. "Ad Hoc On Demand Distance Vector (AODV) Routing", referenced above. This is the reason for enabling the G bit in the RREQ packet. However, in place of the G bit, a D bit (Destination only flag) can also be set so that noone other than destination (IAP in this case) replies to the message.

A summary of the Proactive IAP Locator Algorithms are as follows.

A Proactive IAP Locator Daemon of an IAP gets the IP or MAC address of the IAP, and builds an IAP Advertisement packet containing data pertaining to an IP/MAC address of the IAP. The associated IAP is set to 0 as it is itself an IAP, the next hop towards the IAP is also initialized to 0, the number of hops set to 0, and appropriate metrics are set. If the Network Broadcast ID is used it is initialized to 0, and if the power used for the message is not fixed, the quantized value of the power is placed in the power level fields, and the TTL is set to the NETWORK_DIAMETER value. The Proactive IAP Locator Daemon then broadcasts the IAP Advertisement packet on all interfaces. The Proactive IAP Locator Daemon then repeats IAP Advertisement every IAP_ADVERTISEMENT_INTERVAL seconds, which is a configurable parameter, while incrementing the Network Broadcast ID.

A Proactive IAP Locator Daemon of the WRs and SDs listens for an IAP Advertisement packet containing data pertaining to an IP/MAC address of an IAP, a number of hops from the forwarding node, different metrics, and so on, as mentioned above. If the node decides to use the sender as the next hop towards the IAP, the Proactive IAP Locator Daemon issues a RREQ for IAP with a G bit or D bit set to the forwarding node. If an RREP is received, the Proactive IAP Locator Daemon sends an association/update message to the IAP, increments the Hops field, decrements the TTL, update other fields, and forwards to broadcast address on all interfaces. However, if no RREP is received, Proactive IAP Locator Daemon waits for another IA packet and may elect to blacklist the sender for some time. It should be also noted here that all nodes send the IA or Hello message on a periodic basis which can be configurable based on device type or other factors.

As can be appreciated by one skilled in the art, the technique according to the embodiments of the present invention described above avoids the high latency prone route discovery process for a common destination, such as an IAP, while minimizing overhead in the network 100. The technique can be used as an IAP association protocol, and load balancing can be achieved among different IAPs serving the network 100.

Figure 4:
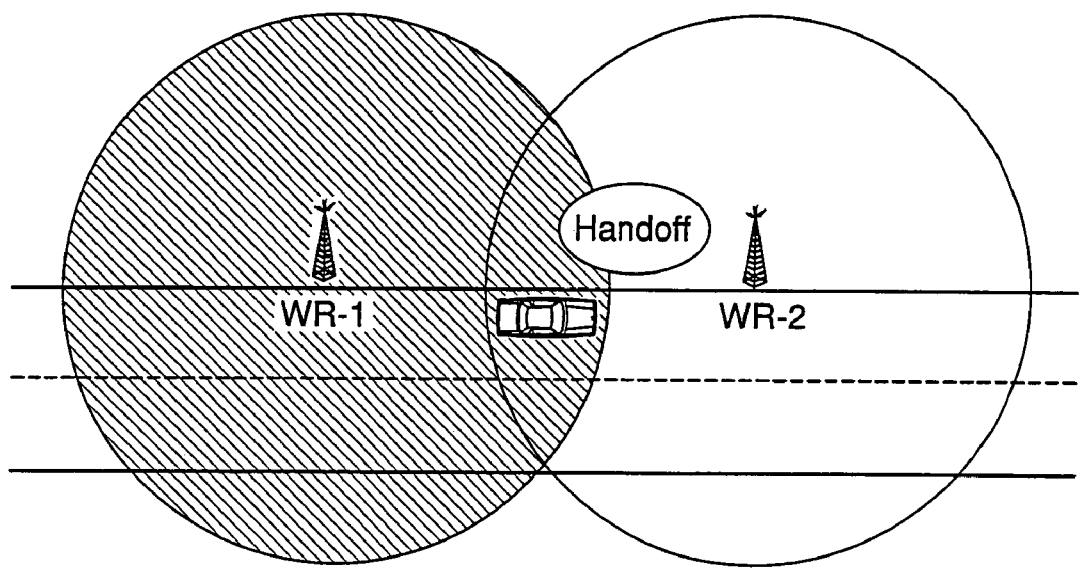
FIG. 4 is a conceptual block diagram of an example of the relationship between a moving subscriber device with respect to stationary wireless routers of the network shown in FIG. 1.

It is also noted that unicasting techniques similar to those discussed above can be used to provide smooth handoff between mobile SD, such as those being used in a moving vehicle. FIG. 4 shows a typical scenario where wireless routers WR1 and WR2 are deployed to provide coverage on a highway. The circles represent the range of these WRs, which means that any device, such as an SD, IAP or another WR will be able to communicate with this WR if it is inside this circle. As it can be seen in the figure, there is a small area where these two circles overlap. In this area, the SD is in position to communicate with both the wireless routers. It is advantageous for service providers to keep this area as small as possible as it reduces the number of WRs that needs to be deployed in a given area.

When a mobile SD is moving at highway speed, it rapidly crosses the coverage area of the wireless routers WR1, and hence, passes by the overlap area in a very small period of time. During this small time period, the SD needs to change its routing table to reflect the fact that its best next hop to the infrastructure has changed from WR1 to WR2. A similar process is referred to as "handoff" in cellular networks.

In an ad-hoc such as network 100 described above, most of the traffic flows between an IAP and the SD, so in this small period of time, the IAP should also be informed about this change of point of attachment of SD to the network 100. The embodiments of the invention described herein provide a system and method to achieve this and other objectives in a fast and efficient manner. Specifically, the embodiments provide a method which enables an SD to update its routing table to reflect the change in its point of attachment to the network 100 (that is, its affiliation with a specific IAP) in a fast and efficient way with minimum loss of packets (called "Smooth Handoff"). An example of a smooth handoff technique is disclosed in U.S. Pat. No. 7,072,323 of Robin U. Roberts and Charles R. Barker, Jr. entitled "A System and Method for Performing Soft Handoff in a Wireless Data Network", granted on Jul. 4, 2006, the entire contents of which is incorporated herein by reference. The embodiments also provide a method for other devices (in particular, IAP 106) to know about this change in a fast and efficient manner.

In a Distance Vector approach, devices such as SDs, IAPs and WRs learn about the changes in routes through periodic routing advertisements. Thus, it takes substantial time (depending upon the periodic interval between these advertisements) before an SD can know that it has moved away from a WR and is close to another WR. This elapsed time is even greater for an IAP which is typically several hops away from the place where routes have changed. This is illustrated in the following example which will be discussed with reference to FIG. 5 in particular.

Figure 5:
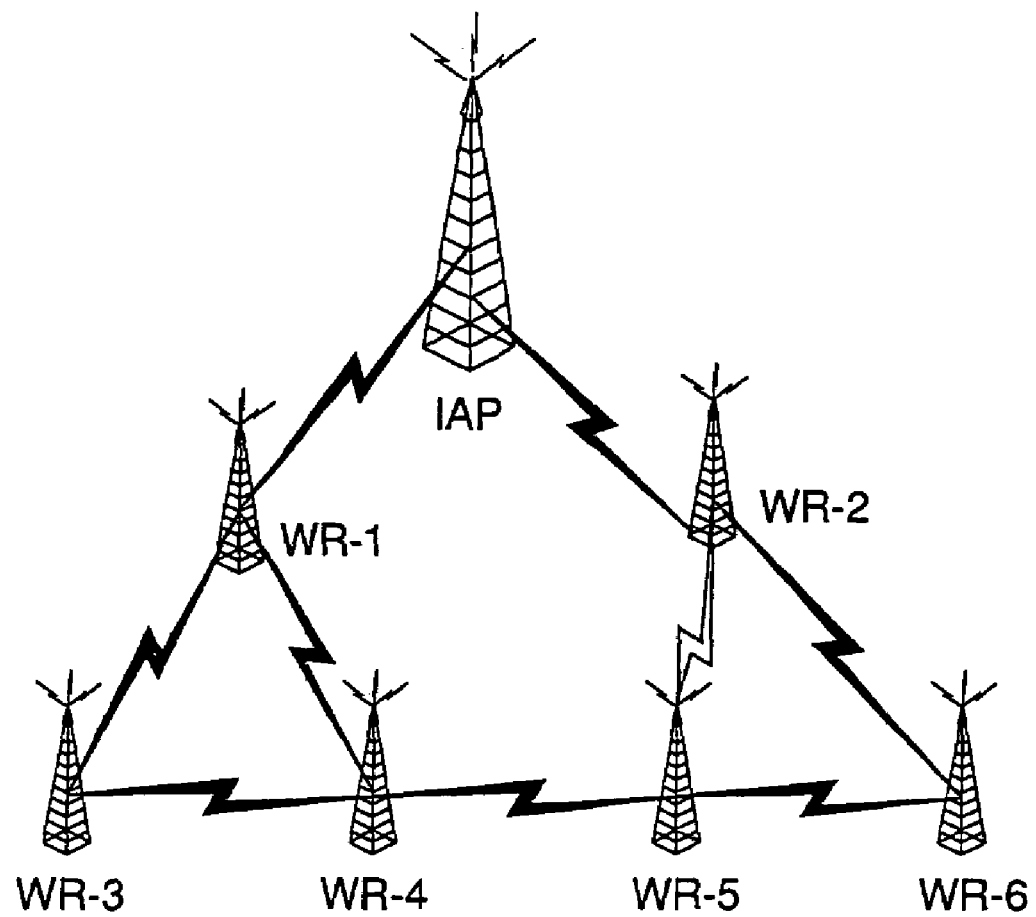
FIG. 5 is a conceptual block diagram of an example of the relationship between a moving subscriber device with respect to stationary wireless routers and access points of the network shown in FIG. 1.
Figure 5:
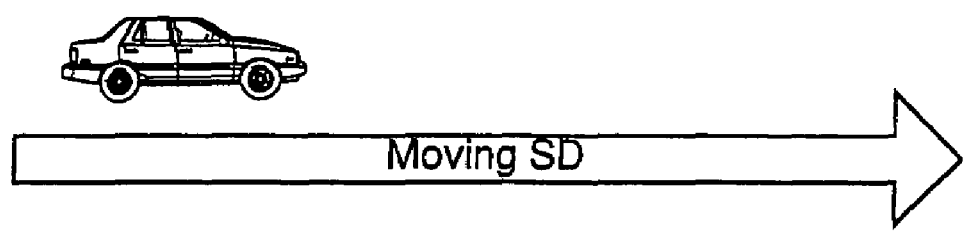

As shown in FIG. 5, a mobile SD is moving at a high speed on a highway where coverage has been provided by wireless routers WR-3 through WR-6. In this example, the SD moves from left to right in FIG. 5 as shown, meaning that it is moving from the coverage area of WR-3 to WR-4. It is assumed that the time at which the mobile (SD) comes in communication range of WR-4 is t, and that the periodic interval between two consecutive Routing Advertisements is T (which is same for SDs and WRs). It is also assumed that there is a three way handshake mechanism which confirms that SD has indeed moved into the coverage range of WR-4 and there exist a bidirectional link between them. This exchange can take up to 3T periods. After this handshake, WR will start advertising the SD. The information will be propagated in following manner (in a worst case scenario)

Time (t+3T): WR-4 is done confirming the presence of SD in its wireless range

Time (t+4T): WR-4 sends this information in its RA, WR-1 receives this information.

Time (t+5T): WR-1 sends this information in its RA, IAP now knows about this

Thus it takes (hops+2) times periodic time of RA to inform the IAP about the change of route of SD, where hops=number of hops between SD and IAP If T is large it will take a long time for the IAP to know about the route change. Also, the time needed to perform the three way handshake can also be so large that the SD actually moves out of the range of the WR involved in the handshake before the handshake process has been completed. One way to deal with this issue is to have a lower T. However, having a lower T substantially increases the overhead of the network. The embodiments of the invention described herein thus provide a technique in which this handshake operation can be performed in a more efficient way so that the information can be propagated to the IAP without major overhead.

To perform this technique, all infrastructure devices, that is, all IAPs and WRs, are required to periodically broadcast a Neighbor Advertisement or Hello Message. This message can have similar fields as in the IA packet mentioned above. A three way handshake protocol can be used here to confirm the bidirectional link.

All SDs actively monitor this Neighbor Advertisement or Hello Message and measure the signal strength of the signal. An SD can also do the three way handshake to determine the received signal strength indicator (RSSI) and post detection signal quality (PDSQ) values on both ends. As soon as the SD determines from the signal strength and/or these values that it will loose connectivity with the old WR and should handoff, the SD unicasts an empty Routing Advertisement to the WR to which it wants to handoff. It can also decide to handoff based on the routing metrics advertised in the Routing Advertisement or calculated by the node. In the example shown in FIG. 5, if the SD is moving from the coverage area of WR-3 to WR-4, the SD will send this unicast routing advertisement (RA) to WR-4. This RA will be empty, that is, there will be no other entries for other nodes but will have the header which will inform the receiver node about this SD. The WR (i.e., WR-4) receiving this unicast RA will update its routing table in normal way, but since this was a unicast RA, it will also unicast one RA to the next hop towards the IAP with which it is affiliated. In this example, upon receiving the RA from SD, WR-4 will consult its routing table to find the best next hop towards IAP, and will send a unicast RA to that node. This RA will just have one entry about the SD. In this example, the best next hop to IAP is WR-1, which will follow the same procedure to direct the unicast RA towards the IAP. Other message types can also be used in place of explicit RA, for example some geo packet can also be used to carry the information carried by routing advertisement. The information can sometimes be piggy backed to data packet as well.

As can be appreciated from the above, the SD can thus handoff in a very small time which does not depend upon the periodic RAs. Also, the IAP will become aware of the movement of SD in real time rather than waiting to receive a periodic RA. Since this critical route update no longer depends upon the broadcast RA, the periodic interval can be increased which will result in substantially lower overhead. Hence, the embodiment achieves fast route convergence and low overhead because the frequency of transmission of Routing Advertisements can be reduced.

Another smooth handoff technique, which is a modification to Ad Hoc On-Demand Distance Vector Routing (AODV), will now be described with regard to FIG. 6.

As can be appreciated by one skilled in the art, AODV is a well known on-demand routing protocol. Specifically, this type of routing protocol creates routes only when desired by the source node. When a node, such as an SD, WR or IAP, requires a route to a destination, such as another SD, WR or IAP, the node initiates a route discovery process within the network 100. This process is completed once a route is found or after all possible route permutations have been examined. Once a route has been established, the established route is maintained by some form of route maintenance procedure until either the destination becomes inaccessible along every path from the source or until the route is no longer desired.

Although the on demand approach reduces the routing overhead, it adds latency in obtaining a route since the routes are not computed before they are actually needed. Because of latency involved in finding routes, packets are needed to buffer the packets at the source. If the node is memory constrained, packet losses can occur due to latency. Therefore, this approach generally does not facilitate smooth handoffs.

The following describes modifications to the standard AODV technique according to embodiments of the present invention, which facilitate smooth handoffs in an ad-hoc network. These modifications also help to eliminate unidirectional links in the network 100, because AODV assumes bidirectional links.

Figure 6:
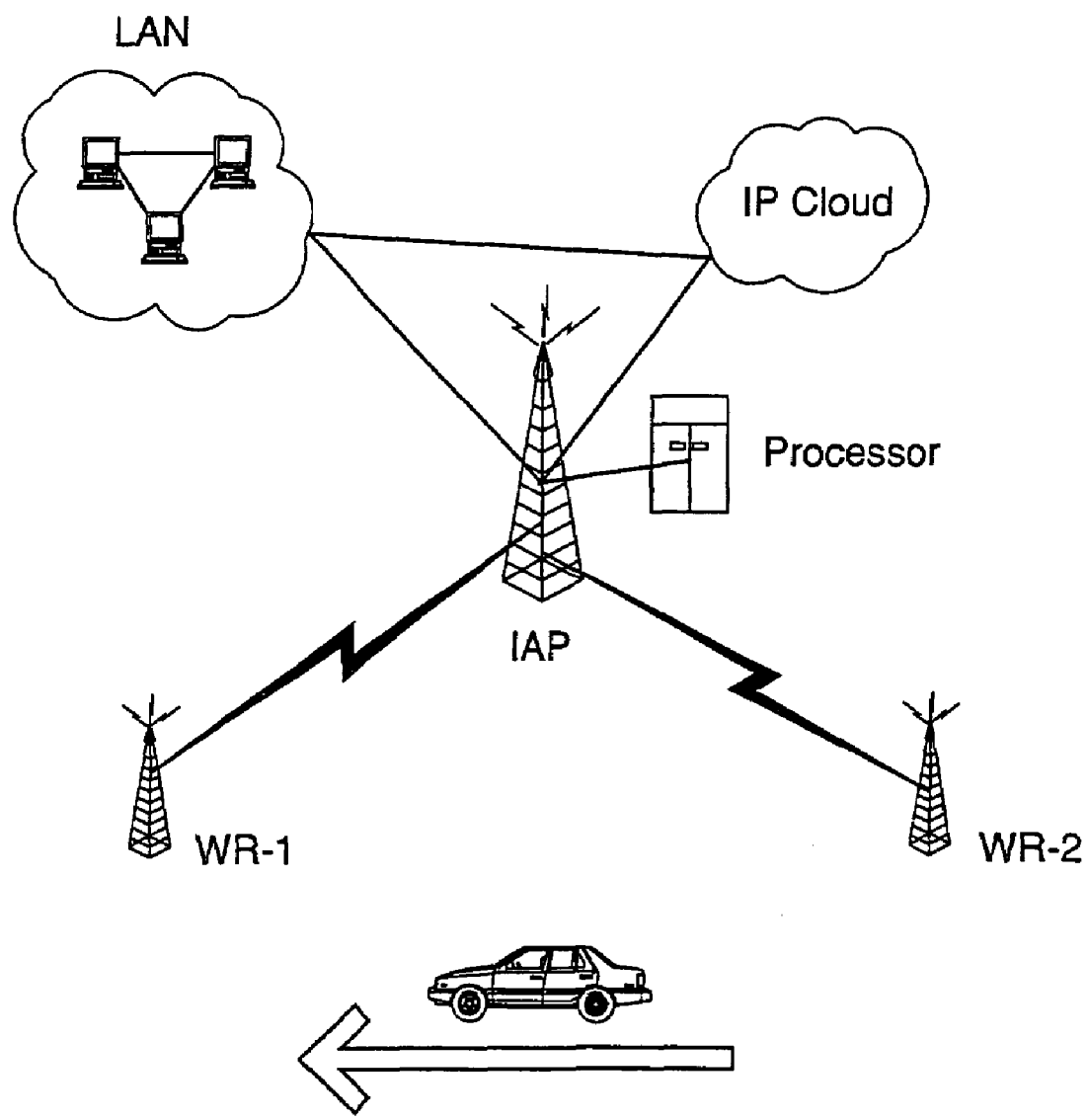
FIG. 6 is another conceptual block diagram of an example of the relationship between a subscriber device, wireless routers and an access point of the network shown in FIG. 1.

FIG. 6 illustrates a portion of the network 100 in which Wireless Routers WR-1 and WR-2 are connected to IAP via wireless links. The IAP is connected to the core LAN as shown in FIG. 1. An SD is also shown which moves at a highway speed.

It can be assumed that most of the time, the SD will need a route to the IAP because the major applications performed by the SD will be Internet browsing, Voice Over Internet Protocol (VOIP) phone calls, and so on. By using the standard AODV routing protocol, much time is consumed before the route discovery process is completed. Furthermore, by the time the SD will receive a route reply, it is probable that the SD has moved to different position which may be outside of the range of a particular WR included in the route reply. The following technique according to an embodiment of the present invention avoids this drawback and helps in achieving smooth-handoffs of the SD from one WR or IAP to another.

In this example, it is assumed that all WRs and SDs are always associated with one IAP. IAPs and WRs periodically transmit a "Hello Message" (or Neighbor Advertisement) which can have fields similar to IA packet described above. The fixed nodes can maintain the routes towards the IAP by sending a periodic RREQ as mentioned above. These nodes can also maintain the route by just sending the RREQ the first time and then by not expiring the route towards the IAP after getting the Route Reply.

To provide smooth handoff, the SDs will send an RREQ for their associated IAP at a periodic rate. This periodic interval is variable depending upon various factors such as speed of the vehicle in which the SD is disposed (if the speed can be determined, for example, by noting the average change of geo location, the activity of the SD, the rate of change of signal quality with the neighboring WRs, and an average number of new neighbors added in the neighbor table). The Route Request packets are generated with either the G bit or D bit set. Accordingly, the destination (IAP) learns about the route without doing any Route Request. If a packet arrives at an IAP destined to some SD, the packet can be delivered because the IAP knows the routes to all of the SDs which are associated with that IAP.

It is also noted that the WRs should periodically broadcast neighbor advertisements in which they should include their IP address as well as that of the IAP with which they are associated. The SD should cache these advertisements and should periodically unicast the RREQ to these WRs. If the link quality measurements are continuously made through passive listening of request-to-send/clear-to-send (RTS/CTS) or these advertisements, the SD can intelligently chose, for example, one to three 1-3 of the WRs it is currently listening to (depending upon the number of back up routes desired) and unicast an RREQ to those WRs. As stated, the number of WRs need not be within the range of one to three, but rather, can be any suitable number based on the number of back up routes desired.

In place of sending periodic Route Request (RREQ) to several wireless routers, all the nodes in the network can simply use the Proactive IAP Locator protocol and achieve smooth handoff of mobile nodes. For this to work, the nodes should actively receive the IA/hello message/neighbor advertisement and should use such a combination of metrics that signify good route in terms of throughput as well the signal strength between the node and the next hop. For example, if the metrics involve the combination of hops, node types, data rate, signal strength, battery power, packet delivery ratio and so on, then as a mobile node moves away from a WR (i.e., WR2) and moves closer to another WR (i.e., WR1) as shown in the FIG. 6, the cumulative routing metrics between the mobile node and the IAP through WR2 will increase while one through WR1 will decrease. As stated, it is assumed in this example that the mobile node is moving away from the coverage area of WR2 and is moving into the coverage area of WR1. Also, it is assumed in this example that lower routing metrics represent a better route than higher routing metrics. Accordingly, the mobile node will automatically switch the routes and send an RREQ to WR1 on determining that the routing metrics through WR1 are better than through WR2, to thus achieve smooth handoffs.

As can be appreciated by one skilled in the art, this scheme has the advantage of eliminating unidirectional links. As discussed above, the AODV protocol assumes bidirectional links and hence, a network 100 operating in accordance with AODV creates a reverse route from a node that receives a RREQ to the node that made the RREQ as soon as the receiving node receives the RREQ. It should be noted that if this link is not bidirectional but rather, unidirectional, the AODV protocol can erroneously create incorrect routes. However, unicasting the RREQ message confirms that the link is bidirectional since the hand-shake of RTS-CTS is completed between the node that is sending the RREQ and the node that is to receive the RREQ before the sending node sends the RREQ. Furthermore, the bidirectional link is verified because the node sending the RREQ receives an acknowledgement (ACK) back for the unicasted RREQ from the node that receives the RREQ.

Accordingly, the technique described above provides for smooth handoffs of SDs and low latency in the network 100. Furthermore, each IAP in the network 100 knows about the routes to all SDs associated with itself all the time, and these routes between the IAP and its associated SDs are updated in real time, which can help in reducing the route setup time for phone calls originating from outside network, for example. Furthermore, overhead in the network 100 is minimized because the periodic RREQ can be piggy backed with the data packets which are already being sent from SDs, WRs and so on.

In addition, although all of the techniques described above are used with AODV in the examples given, these techniques can be used with other routing protocols and, in particular, on-demand type routing protocols such as dynamic source routing (DSR) or any other suitable protocol.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method for providing connectivity between an intelligent access point and one or more nodes in an ad hoc communication network, the method comprising:
broadcasting a data packet including an access point advertisement from a sender node to one or more wireless routers within the ad hoc communication network;
receiving the broadcasted data packet by at least one of the wireless routers;
deciding by the at least one of the wireless routers whether to use the sender node as a next hop towards the intelligent access point based on routing criterion associated with the wireless routers and contents of the access point advertisement;
transmitting a unicast route request from the at least one of the wireless routers to the intelligent access point after deciding to use the sender node as the next hop towards the intelligent access point;
transmitting a unicast route reply from the sender node to the wireless router in response to receiving the unicast route request;
storing a route entry associated with the intelligent access point in the wireless router; and
periodically broadcasting a hello message from the wireless router to the one or more nodes identifying the route from the wireless router to the intelligent access point using the stored route entry.

2. An ad hoc communication network, comprising:
an intelligent access point, for providing access to a portion of the ad hoc communication network;
a plurality of wireless routers, wherein the plurality of wireless routers communicate with each other and with the intelligent access point, and further wherein the plurality of wireless routers gain access to the portion of the ad hoc communication network via the intelligent access point; and
a plurality of nodes, wherein the plurality of nodes communicate with each other and with the plurality of wireless routers;
a sender node for broadcasting a data packet including an access point advertisement to one or more of the wireless routers within the ad hoc communication network;
wherein each of the plurality of wireless routers:
receives the broadcasted data packet from the sender node;
decides whether to use the sender node as a next hop towards the intelligent access point based on routing criterion associated with the wireless router and contents of the access point advertisement;
transmits a unicast route request to the intelligent access point after deciding to use the sender node as the next hop towards the intelligent access point;

stores a route entry associated with the intelligent access point, and periodically broadcasts a hello message to the one or more nodes identifying the route from the wireless router to the intelligent access point using the stored route entry.

3. A method for providing connectivity between an intelligent access point and one or more nodes in an ad hoc communication network as claimed in claim 1, wherein the routing criterion comprises at least one of the following: load balancing metrics meeting desired load balancing criteria; routing metrics meeting desired routing criteria; and quality of service (QoS) metrics meeting desired QoS criteria.

4. A method for providing connectivity between an intelligent access point and one or more nodes in an ad hoc communication network as claimed in claim 1, wherein the broadcasted hello message comprises a second access point advertisement.

5. A method for providing connectivity between an intelligent access point and one or more nodes in an ad hoc communication network as claimed in claim 4, further comprising:

receiving the second access point advertisement by at least one of the nodes;

deciding by the node whether to use the wireless router that has broadcasted the hello message as a next hop towards the intelligent access point based on routing criterion associated with the node and contents of the second access point advertisement;

unicast transmitting a second route request message from at least one of the nodes to the wireless router in response to receiving the broadcasted hello message after deciding to use the wireless router as the next hop towards the intelligent access point.

6. A method for providing connectivity between an intelligent access point and one or more nodes in an ad hoc communication network as claimed in claim 5, wherein the routing criterion comprises at least one of the following: load balancing metrics meeting desired load balancing criteria; routing metrics meeting desired routing criteria; and quality of service (QoS) metrics meeting desired QoS criteria.

7. A method for providing connectivity between an intelligent access point and one or more nodes in an ad hoc communication network as claimed in claim 5, wherein the second route request message includes information not requiring that a destination of a route requested by the second route request message reply to the second route request message, the method further comprising:

unicast transmitting a reply to the at least one of the nodes from the wireless router upon receipt of the second route request message, and unicast transmitting a gratuitous reply message from the wireless router to the intelligent access point.

8. A method for providing connectivity between an intelligent access point and one or more nodes in an ad hoc communication network as claimed in claim 7, wherein the gratuitous reply message indicates to the intelligent access point a route from the intelligent access point to the at least one of the one or more nodes.

9. A method for providing connectivity between an intelligent access point and one or more nodes in an ad hoc communication network as claimed in claim 5, wherein the second route request message includes information requiring that a destination of a route requested by the second route request message reply to the second route request message, the method further comprising:

unicast transmitting the second route request message from the wireless router to the intelligent access point upon receipt of the second route request message.

10. A method for providing connectivity between an intelligent access point and one or more nodes in an ad hoc communication network as claimed in claim 9, further comprising:

unicast transmitting a second reply message from the intelligent access point to the at least one of the nodes.

11. A method for providing connectivity between an intelligent access point and one or more nodes in an ad hoc communication network as claimed in claim 1, wherein the ad hoc communication network comprises a wireless ad-hoc peer-to-peer network, and wherein the wireless routers and the one or more nodes communicate in the wireless ad-hoc peer-to-peer network.

12. A method for providing connectivity between an intelligent access point and one or more nodes in an ad hoc communication network as claimed in claim 1, wherein the data packet includes information indicating a number of active nodes in the ad hoc communication network associated with the intelligent access point.

13. A method for providing connectivity between an intelligent access point and one or more nodes in an ad hoc communication network as claimed in claim 1, wherein the broadcasting step comprises periodically broadcasting the data packet.

14. A method for providing connectivity between an intelligent access point and one or more nodes in an ad hoc communication network, the method comprising:

broadcasting a data packet including an access point advertisement from a sender node to a plurality of wireless routers in a broadcast range of the intelligent access point;

receiving the broadcasted data packet by each of the wireless routers;

deciding by each of the wireless routers whether to use the sender node as a next hop towards the intelligent access point based on routing criterion associated with the wireless routers and contents of the access point advertisement;

transmitting a unicast route request from each of the wireless routers to the sender node after deciding to use the sender node as the next hop towards the intelligent access point;

transmitting a respective unicast route reply from the sender node to each of the wireless routers in response to receiving their respective unicast route requests;

storing a route entry associated with the intelligent access point in each of the wireless routers; and periodically broadcasting a hello message from each of the wireless routers to the one or more nodes identifying the route from the respective wireless router to the intelligent access point using the respective stored route entry.

15. A method for providing connectivity between an intelligent access point and one or more nodes in an ad hoc communication network, the method comprising:

broadcasting a data packet including an access point advertisement from a sender node to one or more forwarding nodes within the ad hoc communication network;

receiving the broadcasted data packet by at least one forwarding node;

deciding by the forwarding node whether to use the sender node as a next hop towards the intelligent access point based on routing criterion associated with the forwarding node and contents of the access point advertisement;

transmitting a unicast route request from the forwarding node to the sender node after deciding to use the sender node as the next hop towards the intelligent access point;

transmitting a unicast route reply from the sender node to the at least one forwarding nodes in response to receiving the unicast route request;

storing a route entry associated with the intelligent access point in the at least one forwarding node; and broadcasting a hello message from the at least one forwarding node to at least one other node identifying the route from the at least one forwarding node to the intelligent access point using the stored route entry in response to receiving the unicast route reply.

16. A method for providing connectivity between an intelligent access point and one or more nodes in an ad hoc communication network as claimed in claim 15, wherein the broadcasted hello message includes a second access point advertisement, the method further comprising:

receiving the second access point advertisement by at least one of the nodes;

deciding by the node whether to use the forwarding node that has broadcasted the hello message as a next hop towards the intelligent access point based on routing criterion associated with the node and contents of the second access point advertisement; and unicast transmitting a second route request message from the at least one other node to the at least one forwarding node after deciding to use the forwarding node as the next hop towards the intelligent access point.

17. A method for providing connectivity between an intelligent access point and one or more nodes in an ad hoc communication network as claimed in claim 16, wherein the routing criterion comprises at least one of the following: load balancing metrics meeting desired load balancing criteria; routing metrics meeting desired routing criteria; and quality of service (QoS) metrics meeting desired QoS criteria.

18. A method for providing connectivity between an intelligent access point and one or more nodes in an ad hoc communication network as claimed in claim 16, wherein the second route request message includes information not requiring that a destination of a route requested by the second route request message reply to the second route request message, the method further comprising:

unicast transmitting a reply to the at least one other node from the at least one forwarding node upon receipt of the second route request message, and unicast transmitting a gratuitous reply message from the at least one forwarding node to the intelligent access point.

19. A method for providing connectivity between an intelligent access point and one or more nodes in an ad hoc communication network as claimed in claim 18, wherein the gratuitous reply message indicates to the intelligent access point a route from the intelligent access point to the at least one node.

20. A method for providing connectivity between an intelligent access point and one or more nodes in an ad hoc communication network as claimed in claim 16, wherein the second route request message includes information requiring that a destination of a route requested by the second route request message reply to the second route request message, the method further comprising:

unicast transmitting the second route request message from the at least one node to the intelligent access point upon receipt of the second route request message.

21. A method for providing connectivity between an intelligent access point and one or more nodes in an ad hoc communication network as claimed in claim 20, further comprising:

unicast transmitting a second reply message from the intelligent access point to the at least one other node.

22. An ad hoc communication network as claimed in claim 2, wherein the plurality of wireless routers are in broadcast range of the intelligent access point.

23. An ad hoc communication network as claimed in claim 2, wherein the routing criterion comprises at least one of the following: load balancing metrics meeting desired load balancing criteria; routing metrics meeting desired routing criteria; and quality of service (QoS) metrics meeting desired QoS criteria.

24. An ad hoc communication network as claimed in claim 2, wherein the ad hoc communication network comprises a wireless ad-hoc peer-to-peer network, and wherein the wireless routers and the one or more nodes communicate in the wireless ad-hoc peer-to-peer network.

25. An ad hoc communication network as claimed in claim 2, wherein the broadcasted data packet includes information indicating a number of active nodes in the ad hoc communication network associated with the intelligent access point.

26. An ad hoc communication network, comprising:

an intelligent access point, for providing access to a portion of the ad hoc communication network;

a plurality of wireless routers, wherein the plurality of wireless routers communicate with each other and with the intelligent access point, and further wherein the plurality of wireless routers gain access to the portion of the ad hoc communication network via the intelligent access point; and a plurality of nodes, wherein the plurality of nodes communicate with each other and with the plurality of wireless routers;

a sender node for broadcasting a data packet including an access point advertisement to one or more of the wireless routers within the ad hoc communication network;

wherein each of the plurality of wireless routers:

receives the broadcasted data packet from the sender node;

decides whether to use the sender node as a next hop towards the intelligent access point based on routing criterion associated with the wireless routers and contents of the access point advertisement;

transmits a unicast route request to the intelligent access point after deciding to use the sender node as the next hop towards the intelligent access point;

stores a route entry associated with the intelligent access point, and periodically broadcasts a hello message to the one or more nodes identifying the route from the wireless router to the intelligent access point using the stored route entry in response to a unicast route reply from the intelligent access point.

27. The method of claim 1, wherein the broadcasted data packet comprises an intelligent access point type of node indication indicating that the sender node is the intelligent access point.

28. The method of claim 1, wherein the access point advertisement comprises data pertaining to at least one of the following: a type of the sender node; an address of an associated intelligent access point; a number of hops from the sender node to the associated intelligent access point; an address of next hop towards to the associated intelligent access point; routing metrics to the associated intelligent access point; load balancing metrics; quality of service (QoS) metrics; and power level.

29. The method of claim 1, further comprising blacklisting the sender node by the wireless routers for a predetermined time period in the event of not receiving the unicast route reply from the sender node.

30. The ad hoc communication network of claim 2, wherein the broadcasted data packet comprises an intelligent access point type of node indication indicating that the sender node is the intelligent access point.

31. The ad hoc communication network of claim 2, wherein the access point advertisement comprises data pertaining to at least one of the following: a type of the sender node; an address of an associated intelligent access point; a number of hops from the sender node to the associated intelligent access point; an address of next hop towards to the associated intelligent access point; routing metrics to the associated intelligent access point; load balancing metrics; quality of service (QoS) metrics; and power level.

32. The method of claim 14, wherein the broadcasted data packet comprises an intelligent access point type of node indication indicating that the sender node is the intelligent access point.

33. The method of claim 14, wherein the access point advertisement comprises data pertaining to at least one of the following: a type of the sender node; an address of an associated intelligent access point; a number of hops from the sender node to the associated intelligent access point; an address of next hop towards to the associated intelligent access point; routing metrics to the associated intelligent access point; load balancing metrics; quality of service (QoS) metrics; and power level.

34. The method of claim 14, further comprising blacklisting the sender node by the wireless routers for a predetermined time period in the event of not receiving the unicast route reply from the sender node.

35. The method of claim 15, wherein the broadcasted data packet comprises an intelligent access point type of node indication indicating that the sender node is the intelligent access point.

36. The method of claim 15, wherein the access point advertisement comprises data pertaining to at least one of the following: a type of the sender node; an address of an associated intelligent access point; a number of hops from the sender node to the associated intelligent access point; an address of next hop towards to the associated intelligent access point; routing metrics to the associated intelligent access point; load balancing metrics; quality of service (QoS) metrics; and power level.

37. The method of claim 15, further comprising blacklisting the sender node by the forwarding nodes for a predetermined time period in the event of not receiving the unicast route reply from the sender node.

38. The ad hoc communication network of claim 26, wherein the broadcasted data packet comprises an intelligent access point type of node indication indicating that the sender node is the intelligent access point.

39. The ad hoc communication network of claim 26, wherein the access point advertisement comprises data pertaining to at least one of the following: a type of the sender node; an address of an associated intelligent access point; a number of hops from the sender node to the associated intelligent access point; an address of next hop towards to the associated intelligent access point; routing metrics to the associated intelligent access point; load balancing metrics; quality of service (QoS) metrics; and power level.

40. A method for providing connectivity between an intelligent access point and one or more nodes in an ad hoc communication network, the method comprising:
    broadcasting a data packet including an access point advertisement from a sender node to one or more intermediate nodes within the ad hoc communication network;
    receiving the broadcasted data packet by at least one intermediate node;
    determining by the at least one intermediate node whether the sender node is a viable next hop towards the intelligent access point based on routing criterion associated with the intermediate node and contents of the access point advertisement;
    transmitting a unicast route request from the intermediate node to the sender node after determining that the sender node is a viable next hop towards the intelligent access point;
    transmitting a unicast route reply from the sender node to the at least one intermediate node in response to receiving the unicast route request;
    storing a route entry associated with the intelligent access point in the at least one intermediate node; and
    broadcasting a hello message from the at least one intermediate node to at least one other node identifying the route from the at least one intermediate node to the intelligent access point using the stored route entry in response to receiving the unicast route reply.

41. The method of claim 40, wherein the routing criterion comprises at least one of the following: load balancing metrics meeting desired load balancing criteria; routing metrics meeting desired routing criteria; and quality of service (QoS) metrics meeting desired QoS criteria.

42. The method of claim 40, wherein the broadcasted data packet comprises an intelligent access point type of node indication indicating that the sender node is the intelligent access point.

43. The method of claim 40, wherein the access point advertisement comprises data pertaining to at least one of the following: a type of the sender node; an address of an associated intelligent access point; a number of hops from the sender node to the associated intelligent access point; an address of next hop towards to the associated intelligent access point; routing metrics to the associated intelligent access point; load balancing metrics; quality of service (QoS) metrics; and power level.

44. The method of claim 40, further comprising blacklisting the sender node by the intermediate nodes for a predetermined time period in the event of not receiving the unicast route reply from the sender node.

45. The method of claim 40, wherein the broadcasted hello message includes a second access point advertisement, the method further comprising:
    receiving the second access point advertisement by at least one of the nodes;
    determining by the node whether the intermediate node that has broadcasted the hello message is a viable next hop towards the intelligent access point based on routing criterion associated with the node and contents of the second access point advertisement;
    unicast transmitting a second route request message from the at least one other node to the at least one intermediate node after determining that the intermediate node is a viable next hop towards the intelligent access point.

46. The method of claim 45, wherein the second route request message includes information not requiring that a destination of a route requested by the second route request message reply to the second route request message, the method further comprising:

unicast transmitting a reply to the at least one other node from the at least one intermediate node upon receipt of the second route request message, and unicast transmitting a gratuitous reply message from the at least one intermediate node to the intelligent access point.

47. The method of claim 46, wherein the gratuitous reply message indicates to the intelligent access point a route from the intelligent access point to the at least one node.

48. The method of claim 45, wherein the second route request message includes information requiring that a destination of a route requested by the second route request message reply to the second route request message, the method further comprising:

unicast transmitting the second route request message from the at least one node to the intelligent access point upon receipt of the second route request message.

49. The method of claim 48, further comprising:

unicast transmitting a second reply message from the intelligent access point to the at least one other node.

* * * * *